(12) United States Patent
Feiste et al.

(10) Patent No.: US 9,977,677 B2
(45) Date of Patent: May 22, 2018

(54) EXECUTION SLICE WITH SUPPLEMENTAL INSTRUCTION PORT FOR AN INSTRUCTION USING A SOURCE OPERAND FROM ANOTHER INSTRUCTION PORT

(71) Applicant: International Business Machines Corporation, Armonk, NY (US)

(72) Inventors: Kurt A. Feiste, Austin, TX (US); Christopher M. Mueller, Pflugerville, TX (US); Dung Q. Nguyen, Austin, TX (US); Eula F. Tolentino, Austin, TX (US); Tien T. Tran, Austin, TX (US); Jing Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 15/093,172

(22) Filed: Apr. 7, 2016

(65) Prior Publication Data

US 2017/0293488 A1    Oct. 12, 2017

(51) Int. Cl.
*G06F 9/34* (2018.01)
*G06F 9/38* (2018.01)
*G06F 9/30* (2018.01)

(52) U.S. Cl.
CPC .......... *G06F 9/3836* (2013.01); *G06F 9/3009* (2013.01); *G06F 9/34* (2013.01); *G06F 9/3824* (2013.01)

(58) Field of Classification Search
CPC .......... G06F 9/34; G06F 9/3836; G06F 9/3824
See application file for complete search history.

(56) References Cited

U.S. PATENT DOCUMENTS

| | | | |
|---|---|---|---|
| 5,303,358 A * | 4/1994 | Baum | G06F 9/3001 712/226 |
| 5,838,940 A | 11/1998 | Savkar et al. | |
| 8,578,358 B2 | 11/2013 | Gonion | |
| 2003/0236965 A1* | 12/2003 | Sheaffer | G06F 9/30076 712/209 |
| 2011/0280314 A1 | 11/2011 | Sankaran et al. | |
| 2014/0095833 A1* | 4/2014 | Gschwind | G06F 9/30 712/205 |
| 2015/0058573 A1* | 2/2015 | Blomgren | G06F 9/30043 711/125 |
| 2015/0324204 A1 | 11/2015 | Eisen et al. | |
| 2015/0324205 A1* | 11/2015 | Eisen | G06F 9/30149 712/215 |

\* cited by examiner

*Primary Examiner* — Jyoti Mehta
(74) *Attorney, Agent, or Firm* — Middleton Reutlinger (57) ABSTRACT

Supplemental instruction dispatch may be used in some instances in a parallel slice processor to dispatch additional instructions, referred to as supplemental instructions, to supplemental instruction ports of execution slices and using primary instruction ports of one or more execution slices to supply one or more source operands for such supplemental instructions. In addition, in some instances, in lieu of or in addition to supplemental instruction dispatch, selective slice partitioning may be used to selectively partition groups of execution slices in a parallel slice processor based upon a threading mode within which such execution slices are executing.

18 Claims, 7 Drawing Sheets

EXECUTION SLICE WITH SUPPLEMENTAL INSTRUCTION PORT FOR AN INSTRUCTION USING A SOURCE OPERAND FROM ANOTHER INSTRUCTION PORT

BACKGROUND

The invention is generally related to data processing, and in particular to dispatching instructions in computer processors.

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

In some existing designs, specific resources and pipelines are typically allocated for execution of different instruction streams, and multiple pipelines allow program execution to continue even during conditions when a pipeline is busy. However, resources may still be tied up for pipelines that are busy, and when all the pipeline(s) assigned to an instruction stream are busy, the instruction stream may become stalled, reducing the potential throughput of the processor core.

SUMMARY

In some embodiments consistent with the invention, a circuit arrangement includes a plurality of dynamically-combinable parallel execution slices configured to execute instructions from one or more instruction streams, dispatch logic coupled to the plurality of execution slices and configured to dispatch the instructions from the one or more instruction streams to the plurality of execution slices, and a plurality of first instruction ports respectively disposed in the plurality of execution slices and configured to receive instructions having up to N source operands from the dispatch logic. A first execution slice among the plurality of execution slices includes a second instruction port configured to receive supplemental instructions from the dispatch logic and issue logic coupled to the second instruction port and the respective first instruction port of the first execution slice and configured to, upon receipt of instructions at both of the first and second instruction ports during a dispatch cycle, queue both instructions using at least one source operand received from at least one of the plurality of first instruction ports as a source operand for the instruction received at the second instruction port. In addition, the dispatch logic is further configured to, during a first dispatch cycle, selectively dispatch a supplemental instruction to the second instruction port concurrently with dispatching a plurality of instructions to the respective first instruction ports of the plurality of execution slices by communicating at least one source operand for the supplemental instruction to at least one of the plurality of first instruction ports.

In addition, in some embodiments consistent with the invention, a circuit arrangement includes a plurality of dynamically-combinable parallel execution slices configured to execute instructions from one or more instruction streams, the plurality of execution slices configured to operate in a plurality of threading modes that includes at least first and second threading modes, the first and second threading modes respectively supporting first and second numbers of hardware threads, and dispatch logic coupled to the plurality of execution slices and configured to dispatch the instructions from the one or more instruction streams to the plurality of execution slices. When the plurality of execution slices are operating in the first threading mode, the dispatch logic is configured to dispatch instructions to each of the plurality of execution slices for execution in the first number of hardware threads, and when the plurality of execution slices are operating in the second threading mode, the dispatch logic is configured to dispatch instructions associated with any hardware thread among a first subset of the second number of hardware threads to a first subset of the plurality of execution slices and to dispatch instructions associated with any hardware thread among a second subset of the second number of hardware threads to a second subset of the plurality of execution slices.

Some embodiments may also include methods, integrated circuit chips, devices, systems and/or program products incorporating any of the aforementioned concepts.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

DETAILED DESCRIPTION

In embodiments consistent with the invention, rotational dispatch may be used to dispatch instructions from one or more instruction streams to a plurality of execution slices that can be assigned arbitrarily to execute instructions, e.g., when a slice executing a current instruction for a stream is busy, in which slices can be combined on-the-fly to execute either wider instructions or single-instruction-multiple-data (SIMD) instructions requiring multiple slices to handle the multiple data, etc. In some instances, supplemental instruction dispatch may be used to dispatch additional instructions, referred to as supplemental instructions, to supplemental instruction ports of execution slices and using primary instruction ports of one or more execution slices to supply one or more source operands for such supplemental instructions. In addition, in some instances, in lieu of or in addition to supplemental instruction dispatch, selective slice partitioning may be used to selectively partition groups of execution slices based upon a threading mode within which such execution slices are executing.

A parallel slice processor core in the illustrated embodiments may be considered to be a processor core that implements a plurality of dynamically-combinable execution slices that generally may be assigned arbitrarily to execute various types of instructions, and that may be combined dynamically (i.e., on-the-fly) to execute one or both of multi-width instructions or Single Instruction Multiple Data (SIMD) instructions including multiple data values to be processed by the same instruction. The support for arbitrary assignment of instructions to execution slices may in some embodiments enable an instruction from a particular instruction stream to be routed to a different execution slice when a different execution slice that was handling the instruction stream is busy, while support for multi-width and/or SIMD instructions enhances flexibility and versatility for handling different types of workloads, e.g., productivity workloads, graphical workloads, scientific workloads, network workflows, etc.

A number of variations and modifications to the illustrated embodiments will be apparent to one of ordinary skill in the art. Therefore, the invention is not limited to the specific implementations discussed herein.

Hardware and Software Environment

Figure 1:
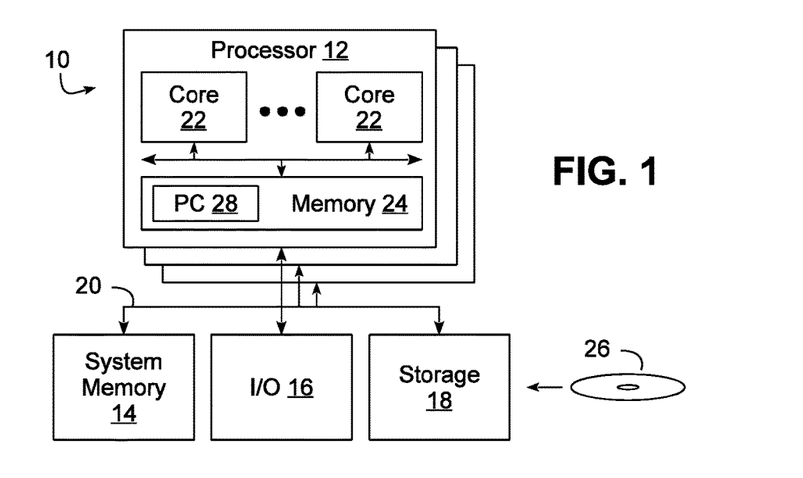
FIG. 1 is a block diagram illustrating an example data processing system in which various techniques disclosed herein may be practiced.

Now turning to the drawings, wherein like numbers denote like parts throughout the several views, FIG. 1 illustrates an example data processing system 10 consistent with some embodiments of the invention. Data processing system 10 includes one or more processors 12 coupled to various additional components such as system memory 14, input/output (I/O) 16 and storage 18 via one or more communication paths 20, e.g., implemented using one or more buses, networks, interconnects, etc. Each processor 12 may include one or more processor cores 22 and local storage 24, e.g., including internal system memory and/or one or more levels of cache memory. Each processor 12 may be similarly configured in some embodiments, while in other embodiments differently-configured processors may be utilized together. Further in multi-core processor implementations, each core 22 may be similarly or different configured as other cores 22 within the same processor 12. It will be appreciated that the invention may be utilized in a wide variety of system configurations, including single processor and/or multi-processor configurations, as well as single core and/or multi-core configurations. Further, the invention may be utilized in various types of application-specific processors, e.g., graphics processors, network processors, coprocessors, service processors, embedded processors, etc.

In some embodiments, system memory 14 may include random-access memory (RAM) representing the main volatile storage of the system. Further, in some embodiments, a single system memory 14 may be supported, while in other embodiments, the memory may be distributed among a plurality of nodes, with one or more processors 12 implemented within each node and having non-uniform memory access among portions of the memory that are in the same or different nodes in the system. Nodes may also be arranged into various hierarchies, e.g., within different cabinets, racks, cards, slots, etc., and interconnected via high speed networks.

System 10 also includes various input/output (I/O) interfaces and devices 16, which may vary based upon the type of system. For example, in some systems, I/O 16 may include adapters and/or interfaces to one or more external networks, such as private networks, public networks, wired networks, wireless networks, etc. In addition, for a single-user system such as a desktop computer, laptop computer, tablet, mobile device, etc., I/O 16 may also include user input devices such as mice, keyboards, touchscreens, microphones, imaging devices, etc. for receiving user input and graphical displays and/or audio playback devices for displaying information. System 10 may also include a storage subsystem 18, which may include non-removable mass storage drives such as solid state disk drives, hard disk drives, etc., as well as removable drives such as flash drives, optical drives, etc., the latter of which may be used, for example, to read program code and/or data stored on a computer readable medium such as an optical disk 26.

Example program code 28, for example, is illustrated in memory 24, which may represent various types of instructions that may be executed by a core 22 of a processor 12, including, for example, user-level applications, operating systems, firmware, middleware, device drivers, virtualization program code, etc. It will be appreciated that program code 28 may also be stored from time to time in other computer readable media, including both various types of non-volatile and volatile memory such as cache memory, system memory, external storage, removable media, etc.

While the system of FIG. 1 is used to provide an illustration of a system in which the processor architecture of the present invention is implemented, it is understood that the depicted architecture is not limiting and is intended to provide an example of a suitable computer system in which the various techniques disclosed herein may be applied.

Further, it will be appreciated that the techniques described herein may be implemented within a circuit arrangement, which generally represents a physical device or system (e.g., one or more integrated circuit devices/chips, cards, boards, components, systems, etc.) incorporating hardware, and in some instances, software, configured to implement such techniques. In addition, it will also be appreciated that implementations utilizing the herein-described techniques may be distributed at least in part in the form a program product including logic definition code that defines a circuit arrangement and that is stored on a computer readable medium, and that the invention applies equally regardless of the particular type of computer readable media being used to actually carry out the distribution. Logic definition program code, for example, may include generic gate netlists, synthesizable forms, e.g., as described in a hardware description language such as Verilog or VHDL, lower-level, physical descriptions such as GDSII, or other types of program code capable of defining at various levels of detail the functionality and/or layout of a manufactured circuit arrangement. Examples of computer readable media include, but are not limited to, non-transitory, physical, recordable type media such as volatile and non-volatile memory devices, floppy disks, hard disk drives, CD-ROMs, and DVDs (among others).

Figure 2:
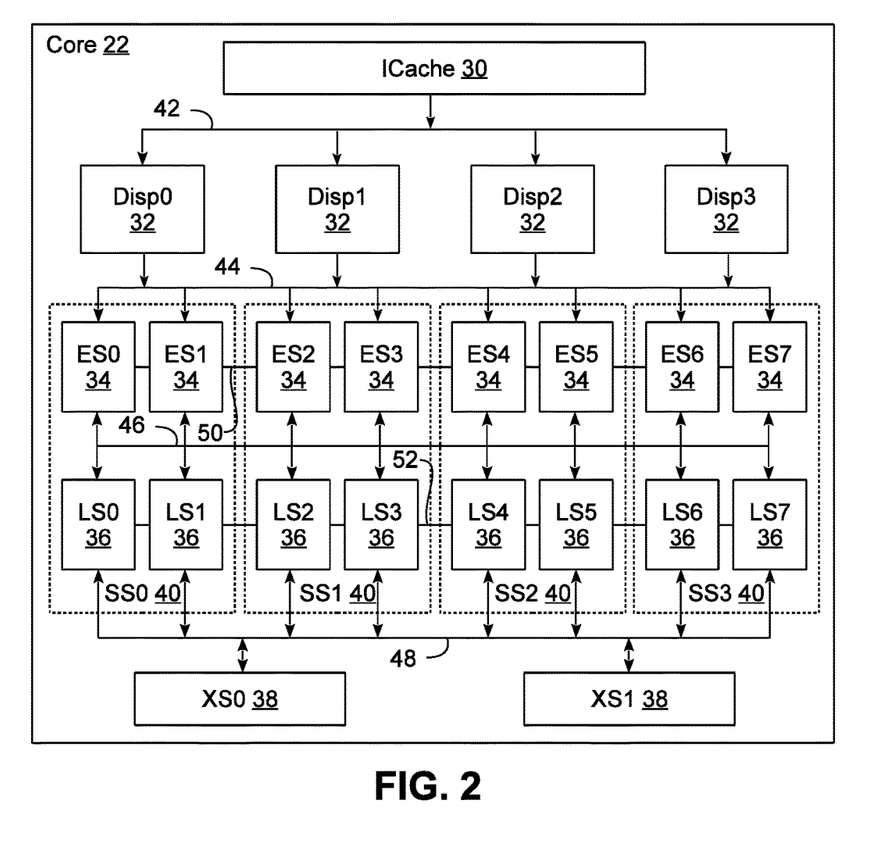
FIG. 2 is a block diagram illustrating further details of an example implementation of one of the processor cores referenced in FIG. 1.

Referring now to FIG. 2, details of an example implementation of processor core 22 of FIG. 1 are illustrated. Processor core 22 may include an instruction cache (ICache) 30 that stores multiple instruction streams fetched from higher-order cache or system memory and presents the instruction stream(s) to a plurality of dispatch queues (Disp0-Disp3) 32. Control logic within processor core 22 controls the dispatch of instructions from dispatch queues 32 to a plurality of execution slices (ES0-ES7) 34 that are coupled to a plurality of load/store slices (LS0-LS7) 36 (also referred to herein as cache slices) that are in turn coupled to a plurality of translation slices (SX0-XS1) 38 that provide access to a next higher-order level of cache or system memory that may be integrated within, or external to, processor core 22.

In some embodiments, sets of two or more pairs of associated execution slices 34 and cache slices 36 may be logically coupled together into superslices (e.g., SS0-SS3) 40, e.g., to support multiple widths of instructions and/or SIMD instructions. In other embodiments, however, no such logical coupling may be supported.

Execution slices 34 are coupled to dispatch queues 32 via a dispatch routing network 44 that permits instructions from any of dispatch queues 32 to any of execution slices 34, although complete cross-point routing, i.e., routing from any dispatch queue 32 to any execution slice 34 may not be supported in some embodiments. Execution slices 34 perform sequencing and execution of logical, mathematical and other operations as desired to perform the execution cycle portion of instruction cycles for instructions in one or more instruction streams, and may be identical general-purpose execution slices. In other embodiments, however, processor core 22 may include one or more special-purpose execution slices 34, e.g., to provide optimized execution of particular types of instructions, so different instantiations of execution slices 34 may vary from one another in some implementations. Execution slices 34 may also include multiple internal pipelines in some embodiments for executing multiple instructions and/or portions of instructions. As a result, whether or not a particular execution slice 34 is considered to be "busy" may vary based upon the availability of different pipelines and/or the types of instructions currently being executed by a particular execution slice. Execution slices 34 may also be coupled to one another in some embodiments by an execution slice communication network 50 through which values may be exchanged between execution slices 34, for example when further processing is performed by one execution slice on values generated by another execution slice. A fully-routed (or cross-point) network may be used to implement execution slice communication network 50 in some embodiments. Alternatively, the connections between execution slices 34 may be made only between particular groups of execution slices, e.g., only neighboring slices may be connected in some implementations. Execution slice communication network 50 may also be used for tandem execution of SIMD or large-operand instructions that utilize concurrent/coordinated execution, although execution of such instructions may be performed in a de-coupled manner in some embodiments.

The load-store portion of an instruction execution cycle, (i.e., the operations performed to maintain cache consistency as opposed to internal register reads/writes), may be performed by cache or load/store slices 36, which are coupled to execution slices 34 by a write-back (result) routing network 46. In the illustrated embodiment, any of load/store slices 36 may be used to perform load-store operations for any of execution slices 34, but in other embodiments load/store slices 36 may be limited to handling load-store operations for only subsets of execution slices 34. In addition, execution slices 34 may issue internal instructions concurrently to multiple pipelines, e.g., an execution slice may simultaneously perform an execution operation and a load/store operation and/or may execute multiple arithmetic or logical operations using multiple internal pipelines. The internal pipelines may be identical, or may be of discrete types, such as floating-point, scalar, load/store, etc. Further, a given execution slice may have more than one port connection to write-back routing network 46, e.g., a port connection may be dedicated to load-store connections to load/store slices 36, while another port may be used to communicate values to and from other slices, such as special-purposes slices, or other execution slices. Write-back results may be scheduled from the various internal pipelines of execution slices 34 to write-back port(s) that connect execution slices 34 to write-back routing network 46.

A load-store routing network 52 may also couple load/store slices 36 to one another to provide conversion transfers for execution of SIMD instructions, processing of instructions with data widths greater than a width of individual load/store slices 36 and/or other operations requiring translation or re-alignment of data between load/store slices 36. An I/O routing network 48 may also be used to couple load/store slices 36 to one or more translation slices 38 that provide access to a next higher-order level of cache or system memory that may be integrated within, or external to, processor core 22.

While the illustrated example shows a matching number of load/store slices 36 and execution slices 34, in practice, a different number of each type of slice may be provided according to resource needs for a particular implementation. Further, while four dispatch queues 32, eight execution slices 34, eight load/store slices 36 and two translation slices 38 are illustrated in FIG. 2, it will be appreciated that the numbers of each of these components may vary in different embodiments. In addition, it will be appreciated by those of ordinary skill in the art having the benefit of the instant disclosure that the various networks and interconnects 42-52 may be implemented in a number of different manners, including unidirectional networks, cross-point networks, multiplexed interconnects, and point-to-point interconnects, among others. As such, the invention is not limited to the particular configuration illustrated in FIG. 2.

Figure 3:
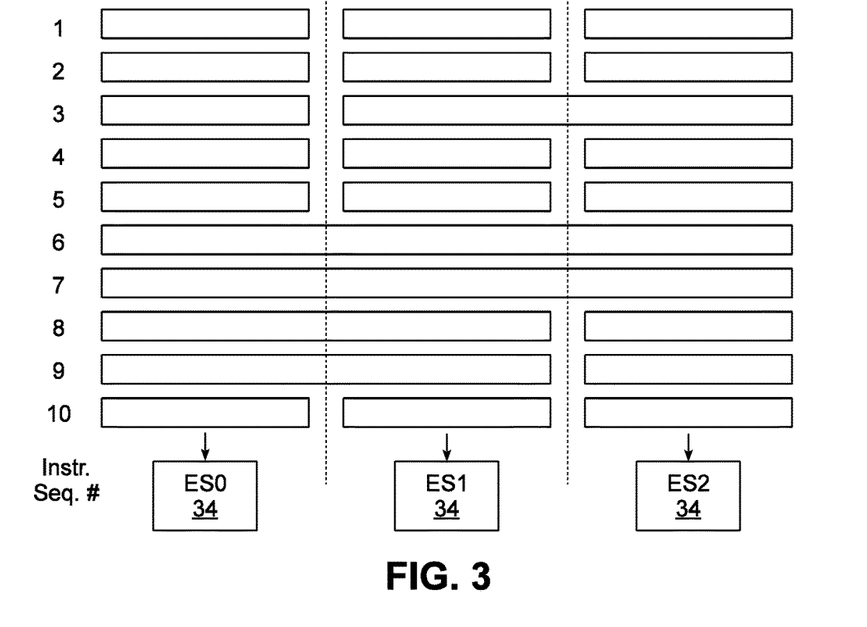
FIG. 3 is a block diagram illustrating an example dispatch of instructions by processor core of FIG. 2.
Figure 4:
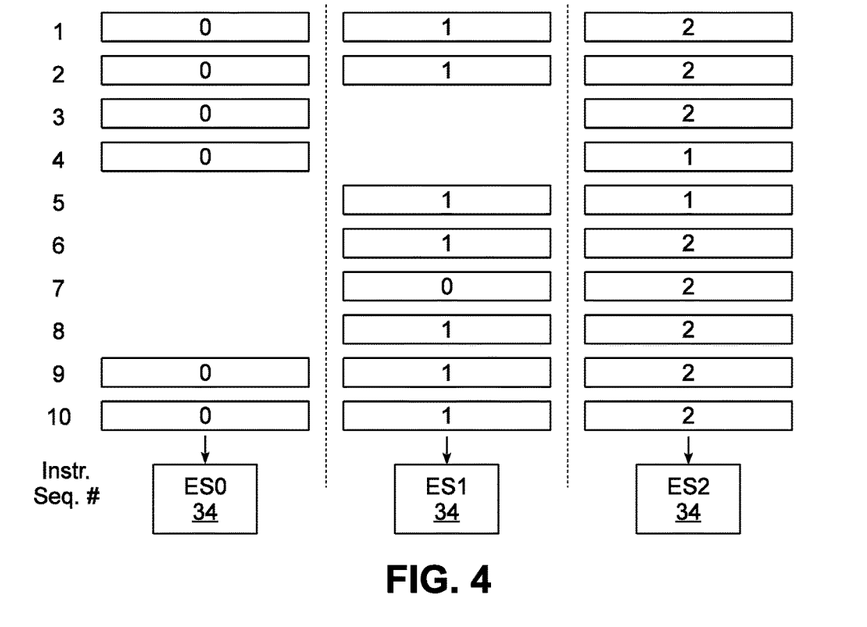
FIG. 4 is a block diagram illustrating another example dispatch of instructions by processor core of FIG. 2.

FIGS. 3 and 4 next illustrate various examples of types of instruction routing to execution slices 34 in some embodiments consistent with the invention. In FIG. 3, for example, three execution slices 34, also designated as ES0, ES1 and ES2, are shown. For the examples presented herein, in will be understood that the instructions dispatched to execution slices 34 may be full external instructions or portions of external instructions, i.e., decoded "internal instructions." Further, in a given cycle, the number of internal instructions dispatched to any of execution slices ES0, ES1 and ES2 may be greater than one and that not every one of execution slices ES0, ES1 and ES2 will necessarily receive an internal instruction in a given cycle. FIG. 3 depicts three columns showing sequences of instructions that are sent to execution slices ES0, ES1 and ES2, respectively. Rows correspond to an instruction dispatch sequence of the instructions, and while the rows are aligned for simplicity of illustration, it is understood that in practice that the dispatches need not occur simultaneously, and there may not be any constraint between the columns on when an execution slice may complete or receive a particular instruction.

In rows 1-2, independent instructions are illustrated as being dispatched to each of execution slices ES0, ES1 and ES2. At row 3, an instruction requiring a wider execution unit is dispatched for execution by dynamically combining execution slices ES1 and ES2, while execution slice ES0 is sent another instruction having a width matching the width of execution slices ES0, ES1 and ES2. At rows 4-5, independent instructions are again dispatched to each of execution slices ES0, ES1 and ES2. In rows 6-7, SIMD instructions having three data values are executed by linking execution slices ES0, ES1 and ES2 to perform the parallel operation, and at rows 8-9, SIMD instructions having two data values are executed by linking execution slices ES0, ES1 while execution slice ES2 is sent other independent instructions. At row 10, execution slices ES0, ES1 and ES2 again commence independent execution of instructions.

Referring now to FIG. 4, another example of instruction processing within processor core 22 is shown, and which is illustrated separately in FIG. 4, but that may be combined with any or all of the execution slice reconfigurations provided in the examples of FIG. 3. FIG. 4 in particular depicts three columns showing sequences of instructions that are sent to execution slices ES0, ES1 and ES2, respectively. As in FIG. 3, rows correspond to an instruction sequence and the number shown in each block is the number of an instruction stream numbered from 0 to 2, to which the instructions being executed belong.

In rows 1-2, instructions are illustrated as being dispatched to each of execution slices ES0, ES1 and ES2 for each of corresponding instruction streams 0-2. Row 3 depicts a point at which execution slice ES1 becomes busy, e.g., due to execution slice ES1 still processing the current instruction in instruction stream 1. As such, in row 4, execution slice ES2 is dispatched an instruction for instruction stream 1, either due to a prioritization, round-robin, or other scheme that permits instructions for instruction streams to be routed to execution slices other than a default execution slice for the instruction stream.

Likewise, in Row 5, execution slice ES0 is illustrated as becoming busy after accepting an instruction from row 4, and execution slice ES1 is illustrated as becoming available to accept further instructions, so execution slice ES1 is illustrated as receiving dispatch of a next instruction for instruction stream 1, with execution slice ES2 concurrently executing another instruction for instruction stream 1. In row 6, execution slice ES0 is shown to still be busy and execution slices ES1 and ES2 are shown resuming execution of instructions for instruction streams 1 and 2, respectively.

At row 7, however, execution slice ES1 is illustrated as being co-opted to execute a next instruction for instruction stream 0, while instruction slice ES0 is still busy executing a current instruction and execution slice ES2 executes another instruction for instruction stream 2. In row 8, execution slice ES1 executes an instruction for instruction stream 1, while execution slice ES2 executes another instruction for instruction stream 2. Then, in rows 9 and 10, all execution slices become available to accept instructions, so each execution slice ES0-ES2 is shown receiving a respective instruction from each instruction stream 0-2.

It will be appreciated that the examples provided in FIGS. 3 and 4 are only illustrative and are provided to show the flexibility of dynamic reconfiguration provided in processor core 22. As can be seen, the configurability provides the potential for maintaining all execution slices 34 in an active execution state while performing various types of operations, such as executing SIMD or variable width instruction streams. The configurability also provides the potential for maintaining instruction streams in an active execution state, even while a busy condition is encountered for some execution slices.

Figure 5:
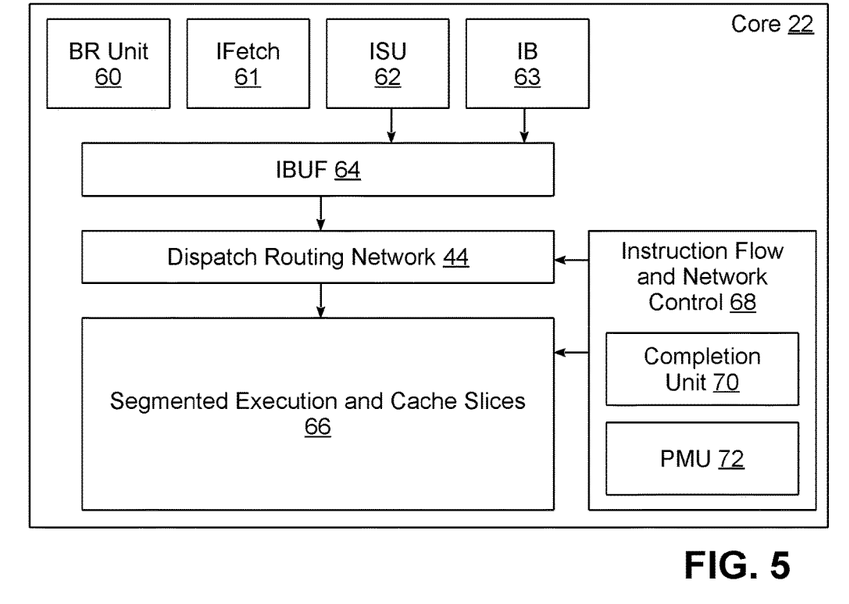
FIG. 5 is a block diagram illustrating additional details of the processor core of FIG. 2.

Referring now to FIG. 5, further details of an example implementation of processor core 22 are illustrated. Processor core 22 in this embodiment may include a branch execution (BR) unit 60, an instruction fetch unit (IFetch) 61 and an instruction sequencer unit (ISU) 62 that control the fetching and sequencing of instructions. A self-learning instruction buffer (TB) 63 may also be included to group instructions in order to perform re-configurations such as those shown in FIG. 3, i.e., arranging instructions in the dispatch queues to setup execution of SIMD and variable-width operations. An instruction buffer (IBUF) 64 may be partitioned to maintain dispatch queues (e.g., dispatch queues 32 of FIG. 2) for each of the instruction streams. In addition, dispatch routing network 44 is illustrated as coupling IBUF 64 to the segmented execution and cache slices 66, representing execution slices 34 and load/store slices 36 of FIG. 2.

An instruction flow and network control block 68 in the illustrated embodiment is configured to perform control of segmented execution and cache slices 66 and dispatch routing network 44 to perform dynamic control of the slices as illustrated in FIG. 3 and FIG. 4, as well as other operations as described in further detail below. An instruction completion unit 70 may be incorporated in instruction flow and network control block 68 to track completion of instructions sequenced by ISU 62 and to control write-back operations by cache slices within segmented execution and cache slices 66. Further, in some embodiments, a power management unit 72 may also be used to selectively activate or deactivate individual slices 34, 36 and/or other associated circuitry to reduce energy consumption, e.g., by reducing or increasing a number of active slices 34, 36 within segmented execution and cache slices 66.

Figure 6:
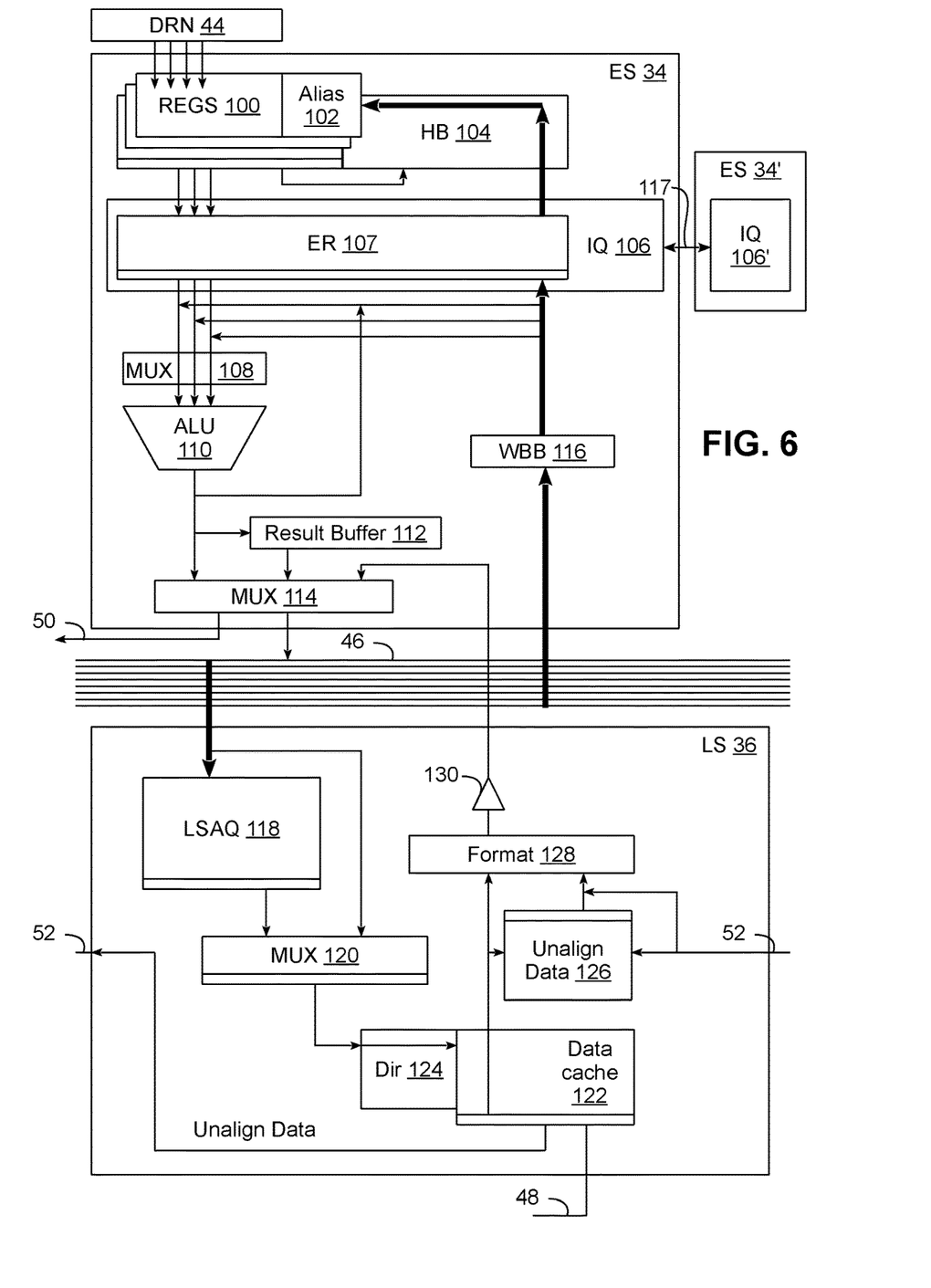
FIG. 6 is a block diagram illustrating an example implementation of one of the execution/cache slice pairs in the processor core of FIG. 2.

Now turning to FIG. 6, it will be appreciated that the internal configuration of each execution slice 34 and load/store slice 36 in processor core 22 may vary considerably in different embodiments, e.g., to provide general-purpose processing functionality, or to provide specialized processing functionality optimized for particular types of instructions or workloads. FIG. 6 illustrates one example implementation of a single execution slice (ES) 34 and load/store slice (LS) 36, which may also be suitable for implementing all of the execution slices 34 and load/store slices 36 in processor core 22 in some embodiments of the invention.

In this embodiment, inputs from the dispatch queues are received via dispatch routing network 44 by a register array 100 so that operands and the instructions may be queued in an execution reservation station (ER) 107 disposed in an issue queue 106. In some embodiments, register array 100 may be architected to have independent register sets for independent instruction streams or SIMD instructions, while dependent register sets that are clones across multiple execution slices may be architected for instances where multiple execution slices are executing non-SIMD instructions or the same segment of an SIMD instruction for the same instruction stream(s). An alias mapper 102 may map the values in register array to any external references, such as write-back values exchanged with other slices over write-back routing network 46. A history buffer (HB) 104 may also be used to provide restore capability for register targets of instructions executed by execution slice 34. Result values selected from write-back routing network 46 and operand values from register array 100 may be selected by an arithmetic logic unit (ALU) input multiplexer 108 and operated on by an ALU 110. A result buffer 112 may receive results from ALU 110 and a multiplexer 114 may be used to make the value of result buffer 112 available to one or more channels of write-back routing network 46 that may be used by a next execution slice 34 processing a next instruction for the instruction stream or a load/store slice 36 to store the result, depending on the target of the operation. Multiplexer 114 may also provide connection to other execution slices via execution slice communication network 50. Write-back routing network 46 may also be coupled to ER 107, HB 104 and ALU input multiplexer 108 by a write-back buffer 116, so that write-back of resource values, retirement of completed instructions and further computation on results may be supported, respectively. Furthermore, in embodiments employing superslices, additional connectivity may be provided between the respective issue queues 106 of the execution slices disposed in a superslice to provide for coordination between execution slices supporting execution of a single instruction stream, e.g., as illustrated by interconnect 117 coupled between issue queue 106 and issue queue 106' of execution slice 34'.

For load/store (LS) slice 36, a load/store access queue (LSAQ) 118 may be coupled to write-back routing network 46, and a direct connection to write-back routing network 46 and LSAQ 118 may be selected by a multiplexer 120 that provides an input to a cache directory 124 of a data cache 122 from either LSAQ 118 or from write-back routing network 46. Connections to other load/store slices 36 may be provided by load-store routing network 52, which may be coupled to receive from data cache 122 and to provide data to a data unalignment block 126 of another load/store slice 36. A data formatting unit 128 may be used to couple load/store slice 36 to write-back routing network 46 via a buffer 130, so that write-back results may be written through from one execution slice to the resources of another execution slice. Data cache 122 may also be coupled to I/O routing network 48 for loading values from higher-order cache/system memory and for flushing or casting-out values from data cache 122.

Various modifications and/or enhancements may be made to the components illustrated in FIG. 6 in other embodiments. For example, in some embodiments, an execution slice may also include multiple internal execution pipelines that support out-of-order and/or simultaneous execution of instructions for one or more instruction streams, with the instructions executed by different execution pipelines being internal instructions implementing portions of instructions received over dispatch routing network 44, or may be instructions received directly over dispatch routing network 44, i.e., the pipelining of instructions may be supported by the instruction stream itself, or the decoding of instructions may be performed upstream of an execution slice. Multiple pipelines within a single execution slice may differ in design and function in some embodiments, or some or all pipelines may be identical, depending on the types of instructions that will be executed by a particular execution slice implementation. For example, in some embodiments specific pipelines may be provided for address computation, scalar or vector operations, floating-point operations, etc. It will be appreciated that various combinations of multiplexers may also be incorporated to provide for routing of execution results to/from a result buffer and routing of write-back results to write-back routing network 46, I/O routing network 48 and other routing network(s) that may be provided for routing specific data for sharing between slices or write-back operations sent to one or more load/store slices 36.

In addition, in some embodiments, write-back routing network 46 may be segmented and may have one segment taking the form of a cross-pointed set of eight busses that permits simultaneous bidirectional communication between each of even-numbered execution slices ES0, ES2, ES4 and ES6 and selected corresponding even-numbered ones of load/store slices LS0, LS2, LS4 and LS6 from FIG. 2. A cluster fence (not shown) may be used to couple this segment write-back routing network 46 to other write-back routing network segments of other groups (clusters) of execution slices and load/store slices, e.g., execution slices ES1, ES3, ES5 and ES7 and cache slices LS1, LS3, LS5 and LS7 of FIG. 2. Further, it will be appreciated that, with respect to bidirectional communication, a load/store slice used for write back of results for an execution slice may be different from a load/store slice used for loading of data, since, as illustrated in FIGS. 3-4, the sequence of instructions may alternate between instruction streams and under such conditions it will generally be desirable to connect a load/store slice to a different execution slice when changing the execution slice used for executing the next instruction in a sequence for an instruction stream. In addition, the relationship between load/store slices and execution slices may be arbitrarily varied, e.g., for instructions referencing large amounts of data, multiple load/store slices may be assigned for loads, while for instructions modifying large numbers of values, multiple load/store slices may be assigned for result write-back operations. By providing a write-back routing network 46 that supports arbitrary connections between load/store slices and execution slices, segmented execution may be efficiently supported by enabling transfer of values from one or more generating slices to one or more receiving slices, which may be the same type of slice as the generating slice, or may be another slice type, e.g., special purpose slice(s).

Embodiments of the present invention may be implemented within the hardware and software environment described above in connection with FIGS. 1-6. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Rotational Dispatch Supporting Supplemental Instruction Dispatch and/or Selective Slice Partitioning Embodiments consistent with the invention may provide instruction dispatch functionality that extends the instruction dispatch functionality disclosed in U.S. Pub. No. 2015/0324204 to Eisen et al., which is assigned to the same assignee as the present application, and which is incorporated by reference herein.

Specifically, in some embodiments consistent with the invention, the aforementioned instruction dispatch functionality may be extended to include support for the dispatch of one or more supplemental instructions in a dispatch cycle when at least a subset of the other instructions to be dispatched in the dispatch cycle have a fewer number of operands than the maximum number of supported operands.

In some embodiments, for example, pairs of slices (e.g., superslices) may be configured to support the dispatch of two instructions having up to three source operands and one destination per dispatch cycle, but allow an additional instruction to be dispatched to one of the slices if all three instructions only use no more than two source operands each. Such embodiments may therefore allow an extra instruction (referred to herein as a supplemental instruction) to be dispatched to a pair of slices in a given dispatch cycle with reduced hardware requirements.

In addition, in some embodiments, the aforementioned instruction dispatch functionality may be extended to support, in lieu of or in addition to the support of supplemental instruction dispatch, selective slice partitioning by threading mode. In particular, in some embodiments, multiple threading modes may be supported, including two or more of single thread mode, two thread mode, four thread mode, eight thread mode, or any other number of simultaneous multithreaded modes, and multiple slices and/or groups of slices may be configured to supply execution resources to support the execution of one or more hardware threads implemented in a processor core.

In some modes, the state of a hardware thread may be shadowed or cloned across multiple slices such that instructions for a particular hardware thread may be executed by any of the slices maintaining the shadowed or cloned state of the hardware thread. On the other hand, in other modes, the slices in a processor core may be partitioned into subsets that support only subsets of the available hardware threads, and thereby reduce the amount of storage (e.g., register space) as well as synchronization needed to maintain cloned or shadowed copies of the state of each hardware thread.

Partitioning may be based on individual slices or on groups of slices. The term "superslice" may be used herein to refer to groups of slices, and while in the illustrated embodiments, a superslice refers to a pair of slices that are logically coupled together and that may, in some embodiments, include additional connectivity to reduce latencies associated with synchronization therebetween (particularly in connection with collective execution of SIMD and/or multi-width instructions), the term is not so limited. Superslices may therefore include more than two slices in some embodiments, and furthermore, the principles of the invention may apply to any groupings of slices, whether or not referred to as superslices.

Figure 7:
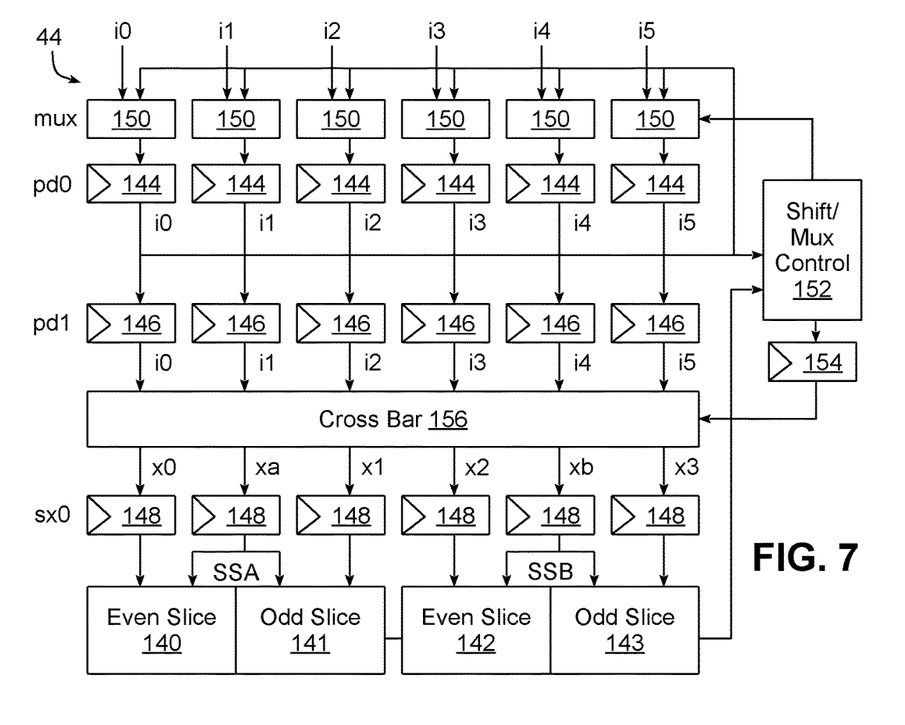
FIG. 7 is a block diagram illustrating a portion of an example implementation of the dispatch routing network referenced in FIG. 6.

FIG. 7, for example, illustrates an example implementation of dispatch routing network 44 incorporating the herein-described functionality. In this embodiment, up to six instructions (designated as i0-i5) may be dispatched to a group of four slices 140, 141, 142 and 143 arranged into a pair of superslices SSA and SSB. Slices 140 and 142 are also referred to as even slices and slices 141 and 143 are also referred to as odd slices. In addition, in this embodiment, dispatch routing network 44 is implemented within a processor core with support for multiple threading modes, e.g., single-threaded (ST), two-threaded (SMT2) and four-threaded (SMT4) modes. Slices are partitioned into superslices in a manner that avoids having to clone all the registers for all the threads in SMT4 mode, but allows ST/SMT2 mode to use both superslices. Further, in ST/SMT2 mode, both threads are cloned to both superslices, but in SMT4 mode, threads 0/2 are partitioned to superslice SSA and threads 1/3 are partitioned to superslice SSB. It will be appreciated that other combinations of threading modes may be supported in other embodiments, e.g., SMT8 modes supporting eight threads, SMT16 modes supporting sixteen threads, etc.

As will become more apparent below, each slice 140-143 in the illustrated embodiment of FIG. 7 includes 64-bit instruction paths and a primary instruction port that receives a 64-bit instruction during each dispatch cycle. Each slice is capable of operating on up to three 64-bit source operands and a 64-bit destination, and each superslice is capable of working jointly on 128-bit data using the 64-bit data paths in the two slices. Each slice also includes a supplemental instruction port that is also capable of receiving an additional 64-bit instruction to support supplemental instruction dispatch consistent with the invention, and when both slices in a superslice require less than two source operands, the third source operand for each slice may be utilized by a supplemental instruction requiring two or fewer source operands. As such, support is provided for the dispatch of three instructions to a superslice with two or fewer source operands for each instruction. The supplemental instruction may be routed to either the even or odd slice depending on availability and optimal allocation.

It will be appreciated that in other embodiments, multiple groups of slices may be supported in a given processor core, and further, that different numbers of slices may be supported in each group. Further, each slice and superslice may be configured to support different combinations and/or sizes of instructions in other embodiments. Therefore, the invention is not limited to the implementation illustrated in FIG. 7.

Dispatch routing network 44 includes three sets of six latches 144, 146 and 148 that respectively define two pre-dispatch stages (pd0, pd1) and one slice transfer stage (sx0). A set of six 7:1 multiplexers 150 output to latches 144 and function as a shifting network, as each multiplexer 150 includes one input to receive a new instruction i0-i5 and six inputs to receive an instruction previously stored in any of the six latches 144.

Control over each multiplexer 150 is provided by a shift/mux control block 152, which implements at least a portion of the routing logic for dispatch routing network 44. Block 152 receives as input the six instructions i0-i5 and outputs control signals for each of multiplexers 150 to pass instructions from the pd0 stage to the pd1 stage (latches 146). Block 152 may also in some embodiments handle intra-cycle dependencies between instructions stored in latches 144, thereby delaying the dispatch of an instruction in one of latches 144 in response to any unresolved dependencies with other instructions stored in other latches 144.

Block 152 also outputs a control signal to a latch 154 that in turn configures a cross bar 156 that couples together latches 146 in the pd1 stage to latches 148 in the sx0 stage. Cross bar 156 may be configurable to route the instruction in any latch 146 to any latch 148 in some embodiments, while in other embodiments, cross bar 156 may restricted to routing instructions between only a subset of the possible combinations of routings between latches 146, 148.

The instructions output by cross bar 156 include primary instructions x0, x1, x2 and x3 that are respectively directed to the primary instruction ports of slices 140, 141, 142 and 143, as well as two supplemental instructions xa, xb that are respectively directed to the supplemental instruction ports of both slices of superslices SSA and SSB.

Instructions i0-i5 are received by dispatch routing network 44 and into stage pd0, where block 152 examines the instruction type along with a plurality of slice busy inputs received from each of slices 140-143. From these inputs, shift/mux control block 152 determines how many instructions the pd0 stage can route to the slices, and then also determines where to route the instructions. The instruction routing itself occurs during the pd1 stage based upon the shift controls determined during the pd0 stage. These controls are latched, and then the actual multiplexing/cross bar occurs at the beginning of the pd1 stage, allowing for a faster cycle time.

Block 152 also determines how many instructions can be routed to slices 140-143 in a particular dispatch cycle. In some embodiments, this determination can be less than optimal to improve cycle time, so long as instruction routing type constraints are still met. Instructions in the pd0 and pd1 stages are in positional order, i.e., i0 is older than i5; however, the instructions in the sx0 stage are not so limited.

In one embodiment, block 152 may receive as input six busy inputs: x0 busy, x1 busy, xa_busy, x2_busy, x3_busy and xb_busy. The x0 busy-x3_busy signals respectively indicate whether the x0-x3 primary instruction ports for slices 140-143 have any available slots. The xa_busy signal is asserted when neither slice 140 nor slice 141 has two available slots, while the xb_busy signal is asserted when neither slice 142 nor slice 143 has two available slots.

Block 152 also receives six 4-bit instruction type signals: i0_instruction_type-i5_instruction_type, respectively from latches 144 corresponding to instructions i0-i5. Each instruction type signal selects from among a plurality of instruction types:

Single—64-bit instruction having two or less source operands;

3src—instruction requires three source operands (i.e., superslice cannot dispatch third instruction);

Dual—128-bit instruction, requires both slices of superslice;

Route2—instruction requires that next two instructions be dispatched to the same superslice; and Route3—instruction requires the next three instructions to be dispatched to the same superslice.

While different encodings may be used in other embodiments, in the illustrated embodiment, the following encoding may be used for the ix_instruction_type signals: Single (0000), 3src (1000), Dual (x100), Route2 (xx10), Route3 (xxx1).

Block 152 also receives four 4-bit slice start signals: start_slice_0-start_slice_3, which indicate a preferred location to start routing instructions. While different encodings may be used in other embodiments, in the illustrated embodiment, the encodings shown in Table I may be used:

TABLE I

Start Slice Encodings

| Control | Mode | Starting (super) slice | |
|---|---|---|---|
| | | Thread 0/2 | Thread 1/3 |
| 1000 | ST/SMT2 | x0 | — |
| 0100 | ST/SMT2 | x1 | — |
| 0010 | ST/SMT2 | x2 | — |
| 0001 | ST/SMT2 | x3 | — |
| 1010 | SMT4 | x0 | x2 |
| 1001 | SMT4 | x0 | x3 |
| 0110 | SMT4 | x1 | x2 |
| 0101 | SMT4 | x1 | x3 |
| others | Invalid | — | — |

As noted above, block 152 is configured to control multiplexers 150 and cross bar 156 to dispatch instructions i0-i5 to slice instruction ports x0-x3 and xa-xb. Each multiplexer 150 has its own seven selects that are zero or one hot, and that handle Symmetric Multithreading (SMT) requirements.

Block 152 then, in response to the aforementioned inputs, dispatches instructions to slices 140-143 to support ST, SMT2 and SMT4 threading modes such that, in SMT4 mode, i0, i1, and i2 are always routed to instruction ports x0, x1, or xa in superslice SSA and i3, i4, and i5 are always routed to instruction ports x2, x3, or xb in superslice SSB. In ST/SMT2 mode, instructions i0-i5 may be routed to any of the x0-x3, xa, and xb instruction ports if they meet the appropriate routing requirements of the instruction. In addition, block 152 handles alignment requirements for 3 Src, Dual, Route2 and Route3 instructions, as well as dispatches around busy slices (indicated by the aforementioned xi_busy signals).

In addition, in some embodiments, greedy and optimal dispatch may be supported. With greedy dispatch, instructions are kept in age order (although instructions may be rotated), and with optimal dispatch, instructions may be dispatched out-of-order within a dispatch group stage, and dependency checking may be performed between pre-dispatch and dispatch, so that dispatch will send correct intra-group dependency information with the instruction to allow more instructions to be dispatched in certain cases with instruction routing restrictions and busy slices. An optimal dispatch may compute an optimal number of instructions that can be dispatched given a count of each type of slice busy states and instruction routing requirements, and dispatch based on alignment requirements first, then dispatching unrestricted instructions in remaining available ports.

Table II, for example, illustrates an example dispatch of instructions by greedy and optimal dispatch approaches:

TABLE II

Greedy v. Optimal

| | i0 | i1 | i2 | i3 | i4 | i5 |
|---|---|---|---|---|---|---|
| ix_instruction_type | Single | Dual | Single | Single | Don't Care | Don't Care |
| ix_busy | 0 | 0 | 0 | 0 | 1 | 0 |
| Greedy | i0 | — | — | — | — | — |
| Optimal | i1 | i1 | — | i0 | i2 | i3 |

Block 152 may also, as noted above, rotate dispatches to other slices in response to the availability of slices. In one embodiment, for example, block 152 may start a search at an equivalent non-busy slice, dispatch restricted instructions first, but start the search for slices in the same position as an instruction would be dispatched if there were no busy slices.

Tables III-V, for example, illustrates several example dispatches of instructions taking into account different start_slice_x signals:

TABLE III start_slice_x = 1000 (ST mode start dispatching at slice x0)

| | i0 | i1 | i2 | i3 | i4 | i5 |
|---|---|---|---|---|---|---|
| ix_instruction_type | 2Src | 2Src | 2Src | 2Src | 2Src | 2Src |
| ix_busy | 0 | 0 | 0 | 0 | 0 | 0 |
| Dispatch | i0 | i1 | i2 | i3 (start search) | i4 | i5 |
| MUX Controls | x0 | x1 | x2 | x3 | xa | xb |

TABLE IV start_slice_x = 0001 (ST mode start dispatching at slice x3)

|                    | i0   | i1   | i2   | i3                | i4   | i5   |
|--------------------|------|------|------|-------------------|------|------|
| ix_instruction_type| 2Src | 2Src | 2Src | 2Src              | 2Src | 2Src |
| ix_busy            | 0    | 0    | 0    | 0                 | 0    | 0    |
| Dispatch           | i1   | i2   | i3   | i0 (start search) | i5   | i4   |
| MUX Controls       | x0   | x1   | x2   | x3                | xa   | xb   |

TABLE V start_slice_x = 1001 (SMT4 mode start dispatching at slice x0 for thread 0, slice x3 for thread 1)

|                    | i0   | i1   | i2   | i3                | i4   | i5   |
|--------------------|------|------|------|-------------------|------|------|
| ix_instruction_type| 2Src | 2Src | 2Src | 2Src              | 2Src | 2Src |
| ix_busy            | 0    | 0    | 0    | 0                 | 0    | 0    |
| Dispatch           | i0   | i1   | i4   | i3 (start search) | i2   | i5   |
| MUX Controls       | x0   | x1   | x2   | x3                | xa   | xb   |

It will be appreciated that the implementation of the aforementioned logic into block 152 would be well within the abilities of one of ordinary skill in the art having the benefit of the instant disclosure. In addition, it will be appreciated that other logic may be used to implement the functionality described herein. Therefore, the invention is not limited to the particular dispatch logic disclosed herein.

Figure 8:
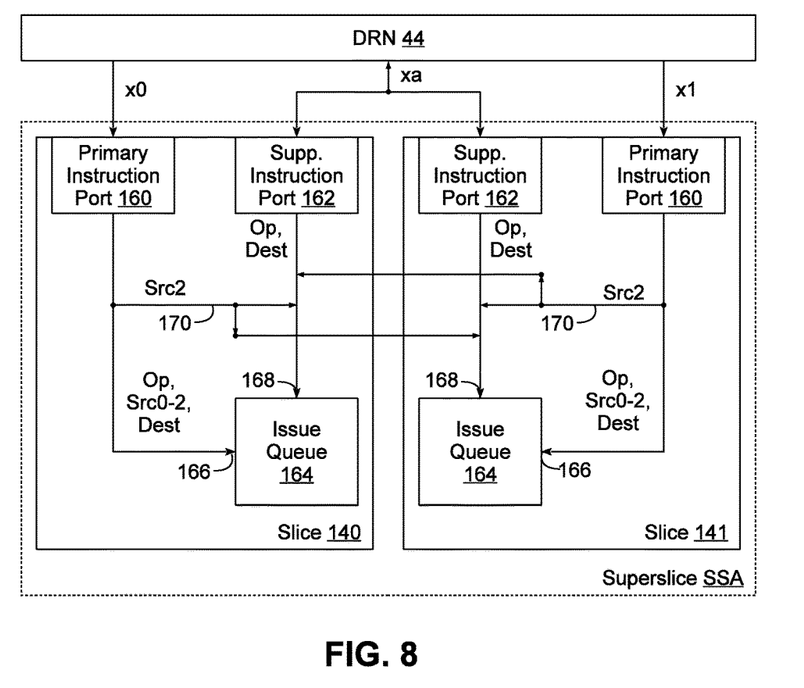
FIG. 8 is a block diagram illustrating supplemental instruction dispatch in the processor core of FIG. 2.

Now turning to FIG. 8, this figure illustrates in greater detail the dispatch of supplemental instructions in superslice SSA of FIG. 7. Each of slices 140, 141 includes a primary instruction port 160 and a supplemental instruction port 162 coupled to a respective issue queue 164. Primary instruction port 160 of slice 140 receives instructions from the x0 output of dispatch routing network 44, while primary instruction port 160 of slice 141 receives instructions from the x1 output of dispatch routing network 44, and each forwards received instructions to a first input 166 of the respective issue queue 164. Supplemental instruction port 162 of each of slices 140, 141 receives instructions from the xa output of dispatch routing network 44 and forwards received instructions to a second input 168 of the respective issue queue 164.

In addition, as noted above, each slice 140, 141 is configured to support three source instructions, and each superslice is configured to receive at least two instructions per dispatch cycle. As such, FIG. 8 illustrates primary instruction port 160 providing an opcode, a destination, and three sources (labeled Src0-2) to issue queue 164.

In addition, consistent with the invention, each superslice is further configured to support the dispatch of a third instruction to one of slices 140, 141 through output xa when each of the instructions received at outputs x0 and x1 has two or fewer source operands, which is provided to a second input 168 of issue queue 164. However, in the illustrated embodiment, the supplemental instruction ports 162 provide only an opcode and a destination for a supplemental instruction, and up to two source operands are provided through the primary instruction ports 160, e.g., the Src2 operands from the primary instructions, provided via paths 170 from each of the primary instruction ports 160. In some embodiments, for example, the Src0 operand for the supplemental instruction may be taken from the Src2 operand from primary instruction port 160 of slice 140, while the Src1 operand may be taken from the Src2 operand from primary instruction port 160 of slice 141.

As such, in the illustrated embodiment a total of six source operand pathways in a superslice may support both two three source instructions and three two source instructions, and using fewer operand pathways, and thus fewer hardware requirements, than would otherwise be required to support three instructions in a superslice.

Figure 9:
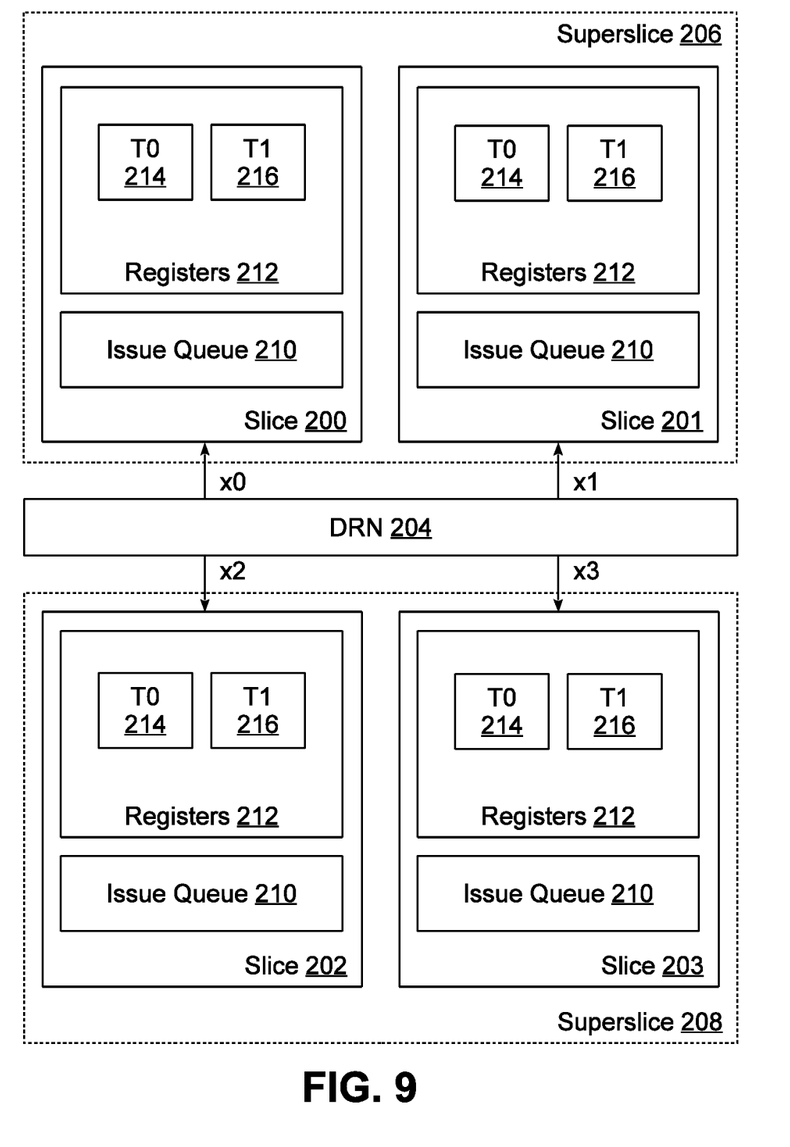
FIG. 9 is a block diagram illustrating register cloning in SMT2 mode in the processor core of FIG. 2.
Figure 10:
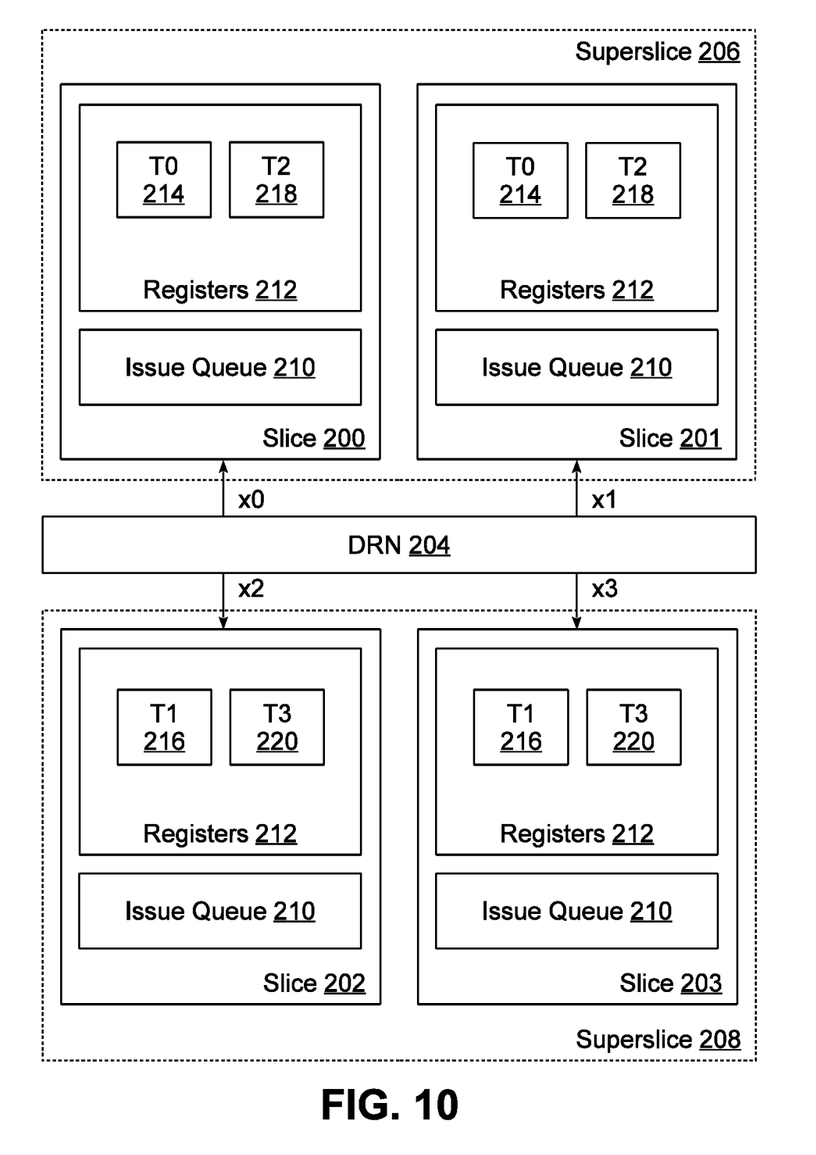
FIG. 10 is a block diagram illustrating register cloning in SMT4 mode in the processor core of FIG. 2.

Next, FIGS. 9-10 illustrate in greater detail the support for selective slice partitioning in another embodiment consistent with the invention. In this implementation, four slices 200, 201, 202, 203 are coupled to a dispatch routing network 204 and grouped into two superslices 206, 208. Each slice 200-203 includes an issue queue 210 and a set of registers 212. Furthermore, while each slice 200-203 may include support for supplemental instruction dispatch in some embodiments, slices 200-203 are illustrated supporting only single instruction dispatch per slice 200-203 through outputs x0-x3, respectively. As such, it will be appreciated that the supplemental instruction dispatch and selective slice partitioning concepts may be implemented separate from one another in some embodiments of the invention.

FIG. 9, for example, illustrates slices 200-203 configured for an SMT2 mode, where two hardware threads (labeled T0 and T1) are executed by the slices. In this mode, the states of both threads T0/T1 are cloned or shadowed across all four slices 200-203, e.g., as represented by blocks 214, 216, which respectively represent the state or context of threads T0, T1. Thus, in SMT2 mode, both threads may be executed using the execution resources of all four slices 200-203 in superslices 206, 208. Likewise, in ST mode, where only one hardware thread (e.g., thread T0) is executed, all four slices 200-203 of superslices 206, 208 may be used to executed the single thread, whereby state data 214 for thread T0 may be cloned or shadowed across all four slices 200-203.

On the other hand, in SMT4 mode, slice partitioning may be used to partition the hardware threads among different slices and/or superslices to avoid the need to clone or shadow the state data for all four hardware threads in all four slices. FIG. 10, for example, illustrates partitioning of slices 200-203 such that threads T0 and T2 are executed by slices 200 and 201 of superslice 206 and threads T1 and T3 are executed by slices 202 and 203 of superslice 208. State data 214 for each thread T0-T3 is cloned or shadowed within the slices in a partition but not across all four slices, e.g., as state data 214, 218 for threads T0 and T2 are cloned or shadowed in slices 200 and 201 and state data 216, 220 for threads T1 and T3 are cloned or shadowed in slices 202 and 203. By partitioning the superslices in this manner, the storage need to support multiple threads is reduced, thereby reducing hardware requirements and/or freeing additional storage within a processor core.

In the illustrated embodiment, cloning or shadowing of hardware thread state may be performed using control logic disposed within each execution slice 200-203, and in some instances, within each issue queue 210. In other embodiments, however, other logic within an execution slice, as well as other logic external to an execution slice, may coordinate the shadowing or cloning of hardware thread state across multiple execution slices. Implementation of such logic would be well within the abilities of one of ordinary skill in the art having the benefit of the instant disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit arrangement, comprising:
a plurality of dynamically-combinable parallel execution slices configured to execute instructions from one or more instruction streams;
dispatch logic coupled to the plurality of execution slices and configured to dispatch the instructions from the one or more instruction streams to the plurality of execution slices; and
a plurality of first instruction ports respectively disposed in the plurality of execution slices and configured to receive instructions having up to N source operands from the dispatch logic;
wherein a first execution slice among the plurality of execution slices includes:
a second instruction port configured to receive supplemental instructions from the dispatch logic; and
issue logic coupled to the second instruction port and the respective first instruction port of the first execution slice and configured to, upon receipt of instructions at both of the respective first and second instruction ports during a dispatch cycle, queue both instructions using at least one source operand received from at least one of the plurality of first instruction ports as a source operand for the instruction received at the second instruction port; and
wherein the dispatch logic is further configured to, during a first dispatch cycle, selectively dispatch a supplemental instruction to the second instruction port concurrently with dispatching a plurality of instructions to the respective first instruction ports of the plurality of execution slices by communicating at least one source operand for the supplemental instruction to at least one of the plurality of first instruction ports.

2. The circuit arrangement of claim 1, wherein the dispatch logic is configured to selectively dispatch the supplemental instruction in response to determining that at least one of the plurality of instructions has less than N source operands.

3. The circuit arrangement of claim 2, wherein the dispatch logic is configured to communicate the at least one source operand for the supplemental instruction to the respective first instruction port for the at least one of the plurality of instructions determined to have less than N source operands.

4. The circuit arrangement of claim 2, wherein a second execution slice among the plurality of execution slices is coupled to the first execution slice and includes a respective second instruction port and respective issue logic configured to, upon receipt of instructions at both of the respective first and second instruction ports of the second execution slice, queue both instructions using at least one source operand received from at least one of the plurality of first instruction ports as a source operand for the instruction received at the second instruction port of the second execution slice.

5. The circuit arrangement of claim 4, wherein the first and second execution slices form a superslice.

6. The circuit arrangement of claim 4, wherein the dispatch logic is configured to communicate the at least one source operand for the supplemental instruction to the first instruction port of either of the first and second execution slices.

7. The circuit arrangement of claim 4, wherein the dispatch logic is configured to communicate first and second operands for the supplemental instruction respectively to the first instruction ports of the first and second execution slices.

8. The circuit arrangement of claim 7, wherein N=3, wherein the dispatch logic is configured to, in the first dispatch cycle, determine that first and second instructions among the plurality of instructions each have two or fewer source operands, and wherein the dispatch logic is configured to, in a second dispatch cycle, suppress dispatching of a supplemental instruction to the second instruction port of the first execution slice in response to determining that third and fourth instructions to be dispatched respectively to the first and second execution slices each have three source operands.

9. An integrated circuit chip comprising the circuit arrangement of claim 1.

10. A program product comprising a non-transitory computer readable medium and logic definition program code stored on the computer readable medium and defining the circuit arrangement of claim 1.

11. A method of executing instructions in a processor core including a plurality of dynamically-combinable parallel execution slices configured to execute instructions from one or more instruction streams, dispatch logic coupled to the plurality of execution slices and configured to dispatch the instructions from the one or more instruction streams to the plurality of execution slices, and a plurality of first instruction ports respectively disposed in the plurality of execution slices and configured to receive instructions having up to N source operands from the dispatch logic, the method comprising:
dispatching a plurality of instructions to the respective first instruction ports of the plurality of execution slices using the dispatch logic during a first dispatch cycle;
selectively dispatching a supplemental instruction to a second instruction port of a first execution slice among the plurality of execution slices concurrently with dispatching the plurality of instructions using the dispatch logic during the first dispatch cycle;
communicating at least one source operand for the supplemental instruction to at least one of the plurality of first instruction ports using the dispatch logic during the first dispatch cycle; and
using issue logic disposed in the first execution slice and coupled to the second instruction port and the respective first instruction port of the first execution slice, queue both instructions dispatched to the first execution slice using the at least one source operand received from at least one of the plurality of first instruction ports as a source operand for the supplemental instruction received at the second instruction port.

12. The method of claim 11, wherein selectively dispatching the supplemental instruction is performed in response to determining that at least one of the plurality of instructions has less than N source operands.

13. The method of claim 12, wherein communicating the at least one source operand for the supplemental instruction to the at least one of the plurality of first instruction ports includes communicating the at least one source operand for the supplemental instruction to the respective first instruction port for the at least one of the plurality of instructions determined to have less than N source operands.

14. The method of claim 12, wherein a second execution slice among the plurality of execution slices is coupled to the first execution slice and includes a respective second instruction port and respective issue logic, the method further comprising, upon receipt of instructions at both of the respective first and second instruction ports of the second execution slice, queuing both instructions dispatched to the second execution slice using at least one source operand received from at least one of the plurality of first instruction ports as a source operand for the instruction received at the second instruction port of the second execution slice.

15. The method of claim 14, wherein the first and second execution slices form a superslice.

16. The method of claim 14, comprising communicating the at least one source operand for the supplemental instruction to the first instruction port of either of the first and second execution slices with the dispatch logic.

17. The method of claim 14, comprising communicating first and second operands for the supplemental instruction respectively to the first instruction ports of the first and second execution slices with the dispatch logic.

18. The method of claim 17, wherein N=3, and wherein the method comprises:

in the first dispatch cycle, determining with the dispatch logic that first and second instructions among the plurality of instructions each have two or fewer source operands; and in a second dispatch cycle, suppressing dispatching of a supplemental instruction to the second instruction port of the first execution slice with the dispatch logic in response to determining that third and fourth instructions to be dispatched respectively to the first and second execution slices each have three source operands.

* * * * *